US012754581B2

(12) United States Patent
Zhang

(10) Patent No.: US 12,754,581 B2
(45) Date of Patent: Oct. 6, 2026

(54) LOW-DROPOUT REGULATOR AND CHIP

(71) Applicant: Huawei Technologies Co., Ltd., Shenzhen (CN)

(72) Inventor: Jinhai Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 18/754,862

(22) Filed: Jun. 26, 2024

(65) Prior Publication Data

US 2024/0345610 A1 Oct. 17, 2024

Related U.S. Application Data

(63) Continuation of application No. PCT/CN2022/140858, filed on Dec. 22, 2022.

(30) Foreign Application Priority Data

Dec. 27, 2021 (CN) ......................... 202111612804.3

(51) Int. Cl.

| | |
|---|---|
| ***G05F 1/575*** | (2006.01) |
| ***G05F 1/565*** | (2006.01) |
| ***G05F 3/26*** | (2006.01) |

(52) U.S. Cl.

CPC .............. *G05F 1/575* (2013.01); *G05F 1/565* (2013.01); *G05F 3/262* (2013.01)

(58) Field of Classification Search

CPC ..... G05F 1/10; G05F 1/46; G05F 1/56; G05F 1/565; G05F 1/575; G05F 1/59; G05F 1/595; G05F 3/26; G05F 3/262

See application file for complete search history.

(56) References Cited

U.S. PATENT DOCUMENTS

| | | | |
|---|---|---|---|
| 8,305,066 B2 | 11/2012 | Lin et al. | |
| 8,648,580 B2 | 2/2014 | Wong | |
| 9,448,574 B2 * | 9/2016 | Motz | G05F 1/575 |
| 10,152,072 B1 | 12/2018 | Elhebeary et al. | |
| 2010/0019747 A1 | 1/2010 | Kao et al. | |
| 2012/0013317 A1 * | 1/2012 | Morino | G05F 1/565 323/280 |
| 2022/0206520 A1 * | 6/2022 | Jiang | G05F 1/56 |

FOREIGN PATENT DOCUMENTS

| | | | |
|---|---|---|---|
| CN | 104820459 A * | 8/2015 | |
| CN | 105549672 A * | 5/2016 | G05F 1/56 |
| CN | 108874010 A | 11/2018 | |

* cited by examiner

*Primary Examiner* — Thienvu V Tran
*Assistant Examiner* — Shahzeb K Ahmad
(74) *Attorney, Agent, or Firm* — Conley Rose, P.C.

(57) ABSTRACT

A low-dropout regulator includes a first power transistor, where the first power transistor is a first NMOS transistor, a drain of the first NMOS transistor is coupled to a power supply end, a source of the first NMOS transistor is configured to provide an output current for a load, and a gate of the first NMOS transistor is configured to receive a second feedback voltage; an error amplifier, where the error amplifier is a common-gate amplifier and is configured to generate a first feedback voltage based on an output voltage provided for the load and a reference voltage; and a loop gain amplifier, where the loop gain amplifier is a common-source amplifier and is configured to generate the second feedback voltage based on the first feedback voltage.

20 Claims, 5 Drawing Sheets

LOW-DROPOUT REGULATOR AND CHIP

CROSS-REFERENCE TO RELATED APPLICATIONS

This is a continuation of International Patent Application No. PCT/CN2022/140858 filed on Dec. 22, 2022, which claims priority to Chinese Patent Application No. 202111612804.3 filed on Dec. 27, 2021. The disclosures of the aforementioned applications are hereby incorporated by reference in their entireties.

TECHNICAL FIELD

This application relates to the field of integrated circuits, and in particular, to a low-dropout regulator and a chip.

BACKGROUND

A low-dropout regulator (LDO) is also referred to as a linear low-dropout regulator, and is a type of a linear direct current regulator. The LDO is configured to provide stable direct current voltage power supply. Compared with a general linear direct current regulator, the low-dropout regulator can operate with a smaller output-input voltage difference.

In chip design, to reduce power supply costs of a chip, it has become a mainstream design requirement to use an on-chip integrated LDO to supply power to other components in the chip. With continuous development of integrated circuits, chip design requires an LDO to meet performance requirements such as low power, a small area (low cost), a high power supply rejection ratio (PSRR), and low noise.

An LDO, of a cascaded flipped voltage follower (CAS-FVF) structure, shown in FIG. 1 is widely used in chip design because of a small quantity of used transistors, a high gain, and advantages such as low power, a small area, and low noise.

However, as a chip integration requirement is increasingly high, components such as an analog front end and a radio frequency front end start to be integrated into a system-on-a-chip (SoC) chip used for wireless communication. Therefore, an isolation design of power supply noise of a digital circuit for an analog circuit in a SoC becomes one of research focuses of SoC chip design. Currently, the power supply noise of the digital circuit is mainly distributed between 10 megahertz (MHz) and 1 gigahertz (GHz), and rejection of noise in this range is still a bottleneck. However, it is difficult for the LDO, of the CAS-FVF structure, shown in FIG. 1 to effectively reject digital noise within the range of 10 MHz to 1 GHz because a PSRR of the LDO deteriorates in a high frequency band. As a result, the LDO cannot meet a noise rejection requirement of the SoC chip design. Therefore, it is urgent to provide an LDO having a high PSRR in a high frequency band.

SUMMARY

Embodiments of this application provide a low-dropout regulator that can be used in a high frequency band and a chip to improve an existing LDO of a CAS-FVF structure, thereby improving PSRR performance of an LDO in a high frequency band.

To achieve the foregoing objectives, the following technical solutions are used in embodiments of this application.

According to a first aspect of embodiments of this application, a low-dropout regulator is provided, including a first power transistor, where the first power transistor is a first N-channel metal-oxide-semiconductor (NMOS) transistor, a drain of the first NMOS transistor is coupled to a power supply end, a source of the first NMOS transistor is configured to provide an output current for a load, and a gate of the first NMOS transistor is configured to receive a second feedback voltage; an error amplifier, where the error amplifier is a common-gate amplifier and is configured to generate a first feedback voltage based on an output voltage provided for the load and a reference voltage; and a loop gain amplifier, where the loop gain amplifier is a common-source amplifier and is configured to generate the second feedback voltage based on the first feedback voltage. In this application, the first NMOS transistor is used as a power transistor. First, a supply voltage received by the drain of the NMOS transistor can be isolated from the output voltage of the source of the first NMOS transistor to a large extent to avoid impact of noise from the supply voltage on the output voltage, and improve a power supply noise rejection capability. Second, the loop gain amplifier cooperates with the first power transistor. Because the output of the source of the first NMOS transistor is decoupled from the input voltage $V_{dd}$ received by the drain of the first NMOS transistor, a small-signal gain $A_{dd}$ from the supply voltage $V_{dd}$ directly to the output voltage through the first power transistor becomes very small. Because a PSRR is inversely proportional to $A_{dd}$ in a high frequency scenario, a high PSRR is implemented in a high frequency band.

In a possible implementation, the error amplifier is a P-channel metal-oxide-semiconductor (PMOS) transistor, a source of the PMOS transistor is coupled to the source of the first NMOS transistor and the load at one point, a gate of the PMOS transistor is coupled to a first bias voltage source, and a drain of the PMOS transistor is configured to output the first feedback voltage, where the first bias voltage source is configured to provide the reference voltage.

In a possible implementation, the loop gain amplifier is a second NMOS transistor, a gate of the second NMOS transistor is coupled to the drain of the PMOS transistor, a source of the second NMOS transistor is coupled to the ground, and a drain of the second NMOS transistor is configured to output the second feedback voltage.

In a possible implementation, the drain of the second NMOS transistor is coupled to the gate of the first NMOS transistor.

In a possible implementation, the low-dropout regulator may further include a first bias current source, where one end of the first bias current source is coupled to the drain of the PMOS transistor, and the other end of the first bias current source is coupled to the ground.

In a possible implementation, the low-dropout regulator may further include a second bias current source, where one end of the second bias current source is coupled to the power supply end, and the other end of the second bias current source is coupled to the drain of the second NMOS transistor and the gate of the first NMOS transistor at one point.

In a possible implementation, the first bias current source and the second bias current source may be implemented based on a current mirror.

In a possible implementation, the low-dropout regulator may further include a second power transistor, where the second power transistor is a third NMOS transistor, and the drain of the first NMOS transistor is coupled to the power supply end through the third NMOS transistor. The second power transistor can further isolate impact of the supply voltage $V_{dd}$ on the output of the source of the first power transistor such that $A_{dd}$ is further reduced, thereby improving a PSRR in a high frequency band.

In a possible implementation, the low-dropout regulator may further include a low-pass filter, where the low-pass filter is separately coupled to the power supply end and a gate of the third NMOS transistor.

In the foregoing implementation, the low-pass filter may include a first resistor and a first capacitor, a first end of the first resistor is coupled to the power supply end, a second end of the first resistor is coupled to a first end of the first capacitor and the gate of the third NMOS transistor at one point, and a second end of the first capacitor is coupled to the ground.

According to a second aspect of embodiments of this application, a chip is further provided. The chip includes a supply voltage input end, the low-dropout regulator provided in any one of the first aspect and the possible implementations of the first aspect, and an analog circuit. The supply voltage input end is configured to provide an input voltage. The low-dropout regulator is configured to perform low-dropout regulation on the input voltage to generate an output voltage, and supply power to the analog circuit by using the output voltage. In this application, the low-dropout regulator that has a high PSRR in a high frequency band and that is provided in the first aspect is used, and a larger PSRR means a smaller ripple of a same input ripple at an output end of the LDO. Therefore, a design requirement of an analog circuit that has a high requirement on a ripple can be met.

In a possible implementation, the chip may be a radio frequency transceiver. In a possible implementation, the chip may be a Wi-Fi chip.

In a possible implementation, the analog circuit may be at least one of a low noise amplifier, a voltage-controlled oscillator, or a frequency mixer.

In a possible implementation, the chip may be an optical image sensor.

In a possible implementation, the chip may be a SoC chip into which a component, for example, the foregoing low noise amplifier, voltage-controlled oscillator, phase-locked loop, or frequency mixer is integrated.

In a possible implementation, the chip further includes a digital circuit, where the digital circuit is coupled to the supply voltage input end. The digital circuit causes a power supply noise in the supply voltage, and it is difficult for an LDO to effectively reject power supply noise within a range of 10 MHz to 1 GHz because a PSRR significantly attenuates in a high frequency band. The low-dropout regulator provided in the foregoing implementations of this application is used. Because a high PSRR can still be implemented in a high frequency band, noise in the high frequency band can be effectively rejected, to meet a design requirement of a chip such as a SoC used in a scenario such as wireless communication.

According to a third aspect of embodiments of this application, a low-dropout regulator is further provided, including a first power transistor, where the first power transistor is a first negative-positive-negative (NPN) transistor, a collector of the first NPN transistor is coupled to a power supply end, an emitter of the first NPN transistor is configured to provide an output current for a load, and a base of the first NPN transistor is configured to receive a second feedback voltage; an error amplifier, where the error amplifier is a common-base amplifier and is configured to generate a first feedback voltage based on an output voltage provided for the load and a reference voltage; and a loop gain amplifier, where the loop gain amplifier is a common-emitter amplifier and is configured to generate the second feedback voltage based on the first feedback voltage. In this application, the first NPN transistor is used as a power transistor, so that a supply voltage received by the collector of the NPN transistor is isolated from the output voltage of the emitter of the first NPN transistor, to avoid impact of noise from the supply voltage on the output voltage, and implement a high PSRR in a high frequency band.

In a possible implementation, the error amplifier is a positive-negative-positive (PNP) transistor, an emitter of the PNP transistor is coupled to the emitter of the first NPN transistor and the load at one point, a base of the PNP transistor is coupled to a first bias voltage source, a collector of the PNP transistor is configured to output the first feedback voltage, where the first bias voltage source is configured to provide the reference voltage.

In a possible implementation, the loop gain amplifier is a second NPN transistor, a base of the second NPN transistor is coupled to the collector of the NPN transistor, an emitter of the second NPN transistor is coupled to the ground, and a collector of the second NPN transistor is configured to output the second feedback voltage.

In a possible implementation, the low-dropout regulator may further include a second power transistor, where the second power transistor may be a third NPN transistor, and the collector of the first NPN transistor is coupled to the power supply end through the third NPN transistor. The second power transistor can further isolate impact of the supply voltage $V_{dd}$ on the output of the emitter of the first power transistor such that $A_{dd}$ is further reduced, thereby improving a PSRR in a high frequency band.

In a possible implementation, the low-dropout regulator may further include a low-pass filter, where the low-pass filter is separately coupled to the power supply end and a base of the third NPN transistor.

DESCRIPTION OF EMBODIMENTS

The following describes the technical solutions in embodiments of this application with reference to the accompanying drawings in embodiments of this application. In this application, "at least one" indicates one or more, "a plurality of" indicates two or more, and "and/or" describes an association relationship between associated objects and indicates that three relationships may exist. For example, A and/or B may indicate the following cases: A exists alone, both A and B exist, and B exists alone, where A and B may be singular or plural. The character "/" generally indicates an "or" relationship between the associated objects. "At least one item (piece) of the following" or a similar expression thereof indicates any combination of these items, including a singular item (piece) or any combination of plural items (pieces). For example, at least one item (piece) of a, b, or c may indicate a, b, c, a and b, a and c, b and c, or a, b and c, where a, b, and c may be singular or plural. In addition, to facilitate clear description of technical solutions of embodiments of this application, in embodiments of this application, words such as "first" and "second" are used to distinguish between same or similar items whose functions and purposes are substantially the same, and a person skilled in the art may understand that the words such as "first" and "second" do not limit a quantity or an execution order. The first, the second, and the like in embodiments of this application are merely described as examples and used to distinguish between described objects, do not indicate an order and do not indicate a particular limitation on a quantity of devices in embodiments of this application, and shall not constitute any limitation on embodiments of this application.

Figure 1:
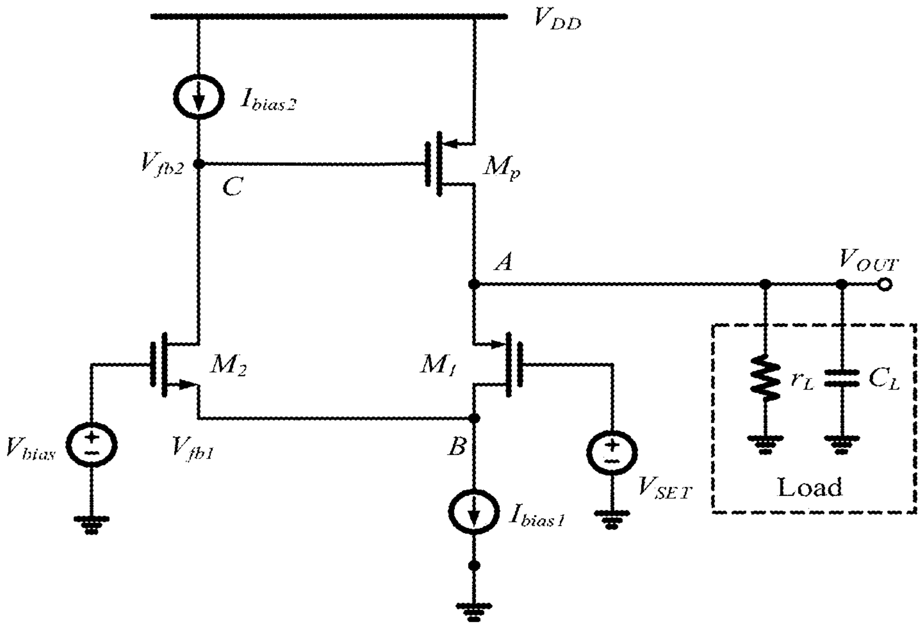
FIG. 1 is a schematic of an LDO of a CAS-FVF structure.

FIG. 1 shows an LDO based on a CAS-FVF structure. $M_p$ is a power transistor implemented based on a PMOS field effect transistor, and may also be referred to as a pass transistor. The power transistor $M_p$ is responsible for providing a current for a load through a "node A". It should be noted that, for ease of representation, in FIG. 1, the load is represented by using a load equivalent resistor $r_L$ and a load equivalent capacitor $C_L$. In an actual circuit, the load may be various circuits or components to which an LDO is required to supply power. $M_1$ is a common-gate amplifier used as an error amplifier (EA). The common-gate amplifier compares an output voltage $V_{out}$ of the LDO at the "node A" with a reference voltage $V_{set}$ coupled to a gate of $M_1$, and feeds back a change of the output voltage $V_{out}$ to a first feedback voltage $V_{fb1}$ of a "node B". $M_2$ is another common-gate amplifier. The common-gate amplifier is configured to provide a loop gain. In this CAS-FVF structure, when the output voltage $V_{out}$ decreases, a current flowing through $M_1$ correspondingly decreases such that the first feedback voltage $V_{fb1}$ decreases. Because $V_{fb2}$ of a drain and $V_{fb1}$ of a source that are in the common-gate amplifier $M_2$ change in phase, the second feedback voltage $V_{fb2}$ also correspondingly decreases. A brief output current relationship of the power transistor $M_p$ is shown in the following formula (1):

$$I_{out} \approx g_{mp} * (V_{DD} - V_{fb2}), \quad (1)$$

where $I_{out}$ is a current of a drain of the power transistor $M_p$, $g_{mp}$ is a transconductance of the power transistor $M_p$, and $V_{dd}$ is a supply voltage of a source of the power transistor $M_p$.

According to the foregoing formula, it can be learned that when $V_{fb2}$ decreases, the output current $I_{out}$ correspondingly increases, and when $I_{out}$ increases, $V_{out}$ increases. In this way, a voltage regulation process is completed.

In conclusion, the entire voltage regulation process of the LDO may be represented as follows:

$$V_{out}\downarrow \rightarrow V_{fb1}\downarrow \rightarrow V_{fb2}\downarrow \rightarrow I_{out}\uparrow \rightarrow V_{out}\uparrow.$$

When the output voltage $V_{out}$ increases, change trends of parameters in a voltage regulation process are exactly opposite to those in the foregoing voltage regulation process, and therefore details are not described herein. This type of LDO of the CAS-FVF structure is suitable for on-chip integration due to advantages such as low power, a small area, and low noise.

Figure 2:
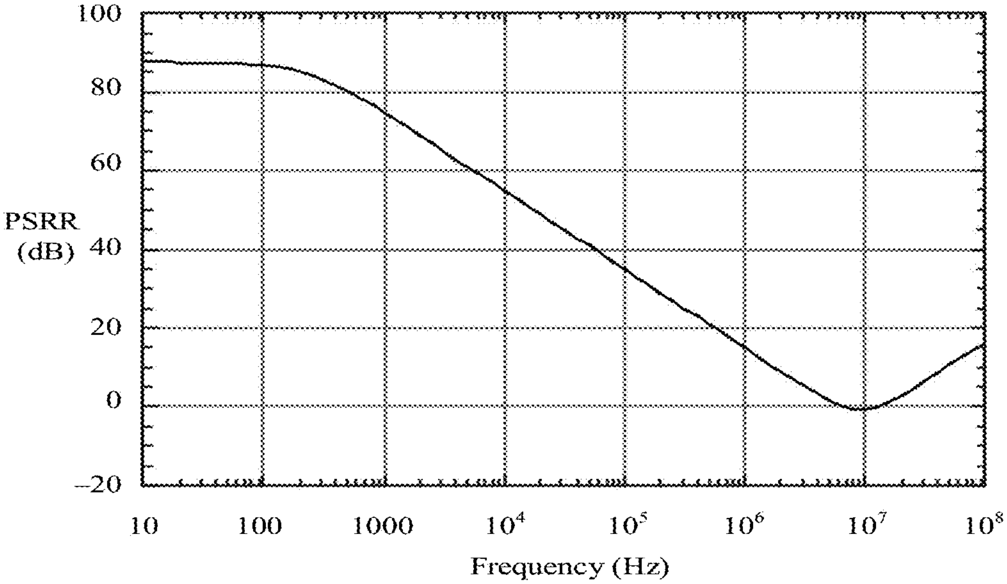
FIG. 2 is a schematic of an amplitude-frequency characteristic of a PSRR of the LDO shown in FIG. 1.

However, as shown in FIG. 2, a PSRR of the LDO of the CAS-FVF structure shown in FIG. 1 significantly decreases as a frequency increases. To be specific, the CAS-FVF LDO shown in FIG. 1 has a high PSRR only in a low frequency band, and the PSRR of the LDO significantly decreases in a high frequency band, for example, near 10 MHz ($10^7$ Hz).

It should be noted that a PSRR may also be referred to as a "power ripple rejection ratio", and is a parameter representing a rejection capability of a regulator for power supply noise (noise from a power supply). To be specific, the PSRR represents a ratio between two voltage gains obtained when an input power supply and an output power supply are considered as two independent signal sources. A higher PSRR indicates a smaller change caused by a change of the input power supply to the output power supply, namely, better performance of rejecting noise in the input power supply.

Because integration of a SoC used for wireless communication is increasingly high, analog components such as an analog front end and a radio frequency front end are to be gradually integrated into the SoC. In addition, more digital circuits in the SoC operate in a high frequency band. Correspondingly, power supply noise, of the digital circuits, distributed between 10 MHz and 1 GHz becomes one of main noise factors of the SoC in a high-frequency application scenario. Radio frequency analog components such as a low-noise amplifier (LNA), a voltage-controlled oscillator (VCO), a phase-locked loop (PLL), and a frequency mixer are very sensitive to the power supply noise within the foregoing range. Therefore, an LDO that supplies power to these components is required to also have a high-PSRR characteristic in a high frequency band to enhance rejection of power supply noise. It is clear that the CAS-FVF LDO shown in FIG. 1 cannot meet this requirement.

Figure 3:
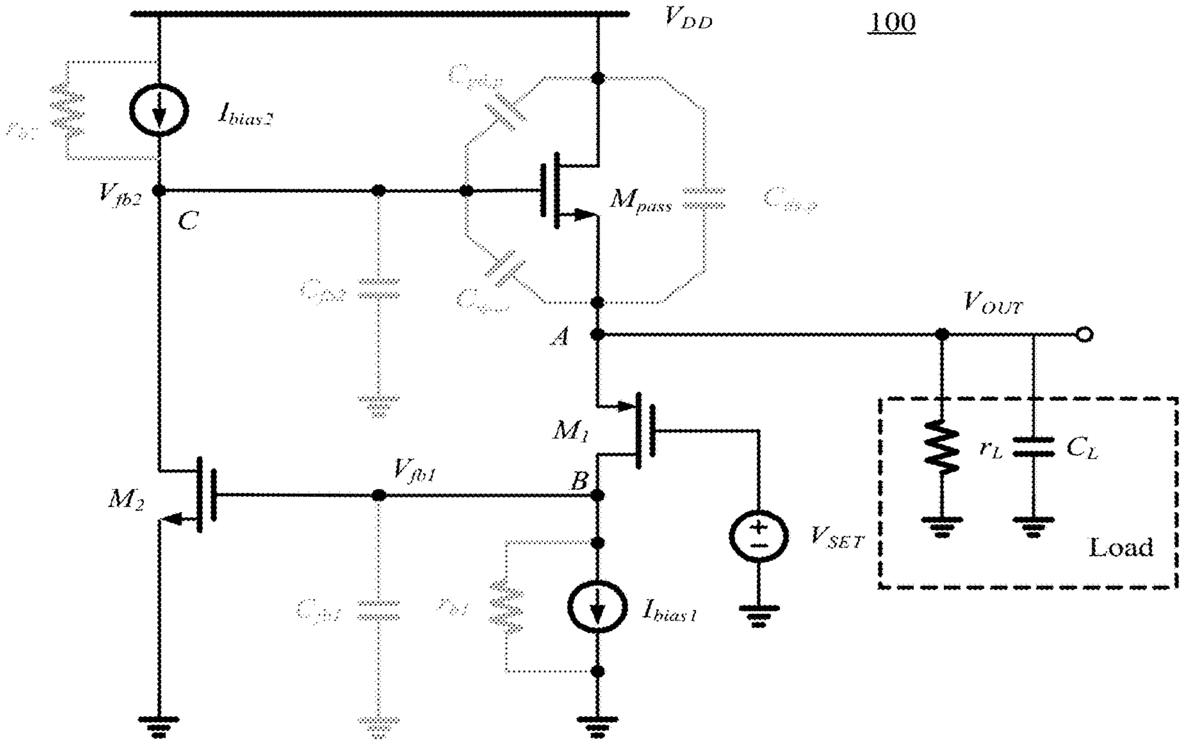
FIG. 3 is a schematic of an LDO that can be used in a high frequency band according to an embodiment of this application.

Based on this, an embodiment of this application provides an LDO 100 having a high PSRR in a high frequency band. As shown in FIG. 3, the LDO 100 includes a first power transistor $M_{pass}$, an error amplifier $M_1$, and a loop gain amplifier $M_2$.

$M_{pass}$ is an NMOS transistor. The first power transistor $M_{pass}$ is used as a power transistor. A drain of the first power transistor is coupled to a power supply end to receive a supply voltage $V_{dd}$, and provides an output current $I_{out}$ for a load at a "node A" through a source of the first power transistor under action of a second feedback voltage $V_{fb2}$ input to a gate. For simplicity, in FIG. 3, the load is also represented by using a load equivalent resistor $r_L$ and a load equivalent capacitor $C_L$. In addition, it should be noted that, in a chip, as an operating voltage of the LDO, the supply voltage $V_{dd}$ may be a voltage provided for the LDO through a power cable after a battery voltage input through a power supply input pin of the chip is regulated by a power supply management unit. Therefore, the power supply end may be actually a node, or may be different nodes that provide a same potential on a power cable. In subsequent descriptions, in this application, the power supply end $V_{dd}$ is used to represent a node that provides the supply voltage $V_{dd}$. Specifically, the output current $I_{out}$ may be represented according to a formula (2):

$$I_{out} = g_{mp} * (V_{fb2} - V_{out}), \quad (2)$$

where $g_{mp}$ is a transconductance of the first power transistor $M_{pass}$.

FIG. 3 further shows a drain-source parasitic capacitance $C_{ds,p}$, a gate-drain parasitic capacitance $C_{gd,p}$, and a gate-source parasitic capacitance $C_{gs,p}$ of the first power transistor $M_{pass}$, to facilitate understanding of a subsequent diagram of a small-signal principle. In FIG. 3, the error amplifier $M_1$ is a common-gate amplifier based on a PMOS transistor. A source of the error amplifier $M_1$ is coupled to the source of the first power transistor $M_{pass}$ and the load at the "node A". A drain of the error amplifier $M_1$ is connected to a first bias current source $I_{bias1}$. A gate of the error amplifier $M_1$ is connected to a first bias voltage source $V_{set}$. The first bias voltage source $V_{set}$ is configured to provide a reference voltage, and the first bias current source $I_{bias1}$ is configured to provide a bias current for the error amplifier $M_1$. The foregoing bias enables the error amplifier $M_1$ to operate in a saturation region, to provide a stable amplification gain. FIG. 3 further shows a parasitic resistance $r_{b1}$ of the first bias current source $I_{bias1}$ and a parasitic capacitance $C_{fb1}$ of a "node B" to the ground, to facilitate understanding of the subsequent diagram of the small-signal principle. The first bias current source $I_{bias1}$ may be implemented in the chip by using a current mirror or the like. This is not specifically limited in this application. The error amplifier $M_1$ is configured to receive an output voltage $V_{out}$ of the LDO 100 at the "node A" through the source of the error amplifier, compare the output voltage with the reference voltage $V_{set}$ coupled to the gate of the error amplifier $M_1$, and output, through the drain of the error amplifier $M_1$, a first feedback voltage $V_{fb1}$ that reflects a change of the output voltage $V_{out}$, to be specific, provide a negative feedback.

The loop gain amplifier $M_2$ is a common-source amplifier based on an NMOS. A gate of the loop gain amplifier $M_2$ is coupled to the drain of the error amplifier $M_1$ at the "node B". A source of the loop gain amplifier $M_2$ is grounded. A drain of the loop gain amplifier $M_2$ is coupled to the power supply end $V_{dd}$ through a second bias current source $I_{bias2}$. FIG. 3 further shows a parasitic resistance $r_{b2}$ of the second bias current source $I_{bias2}$ and a parasitic capacitance $C_{fb2}$ of a "node C" to the ground, to facilitate understanding of the subsequent diagram of the small-signal principle. The loop gain amplifier $M_2$ receives, through the gate of the loop gain amplifier, the first feedback voltage $V_{fb1}$ fed back from the drain of the error amplifier $M_1$, and outputs a second feedback voltage $V_{fb2}$ from the drain of the loop gain amplifier $M_2$ after gain amplification.

At the "node C", the second feedback voltage $V_{fb2}$ is input to the gate of the first power transistor $M_{pass}$, to perform feedback control on the output current of the first power transistor $M_{pass}$.

It should be noted that a person skilled in the art should know that core components of the LDO are an error amplifier and a power transistor. Therefore, in FIG. 3, based on different division manners, the error amplifier $M_1$ and the loop gain amplifier $M_2$ may alternatively be considered as an error amplifier as a whole.

In FIG. 3, the supply voltage $V_{dd}$, the first bias current source $I_{bias1}$, the second bias current source $I_{bias2}$, and the like are used as a bias circuit, to provide a required bias for the entire LDO 100 such that the first power transistor $M_{pass}$, the error amplifier $M_1$, and the loop gain amplifier $M_2$ all operate in a saturation region, thereby providing a stable amplification gain.

In FIG. 3, it may be considered that the output voltage $V_{out}$ is provided based on a sum of the reference voltage $V_{set}$ and a gate-source voltage $V_{gs1}$ of the error amplifier $M_1$, a drain voltage of the error amplifier $M_1$ is provided by a gate-source voltage $V_{gs2}$ of the loop gain amplifier $M_2$, and a drain voltage of the loop gain amplifier $M_2$ is provided by $V_{dd}-(V_{gsp}+V_{out})$. $V_{gsp}$ is a gate-source voltage of the first power transistor $M_{pass}$. An appropriate bias is provided based on these voltages, so that it can be ensured that the first power transistor $M_{pass}$, the error amplifier $M_1$, and the loop gain amplifier $M_2$ all operate in the saturation region, thereby generating the stable gain.

A voltage regulation process of the LDO 100 shown in FIG. 3 is roughly as follows. When the output voltage $V_{out}$ decreases, a current flowing through the error amplifier $M_1$ correspondingly decreases such that the first feedback voltage $V_{fb1}$ decreases. Because the loop gain amplifier $M_2$ uses a common-source amplifier design, a voltage gain of the loop gain amplifier is a negative number. It can be learned that the second feedback voltage $V_{fb2}$ output by the drain of the loop gain amplifier is phase-inverted with the first feedback voltage $V_{fb1}$ received by the gate of the loop gain amplifier, to be specific, if the first feedback voltage $V_{fb1}$ decreases, the second feedback voltage $V_{fb2}$ increases. According to the foregoing formula (2), it can be learned that as the second feedback voltage $V_{fb2}$ increases, the output current $I_{out}$ of the first power transistor $M_{pass}$ based on the NMOS also increases. As the output current $I_{out}$ increases, the output voltage $V_{out}$ of the LDO 100 further increases, thereby implementing voltage regulation.

In conclusion, the entire voltage regulation process, of the LDO 100, based on a negative feedback mechanism may be represented as follows:

$$V_{out}\downarrow \rightarrow V_{fb1}\downarrow \rightarrow V_{fb2}\downarrow \rightarrow I_{out}\uparrow \rightarrow V_{out}\uparrow.$$

A person skilled in the art should know that, in the negative feedback mechanism, when the output voltage $V_{out}$ increases, change trends of parameters in a voltage regulation process are exactly opposite to those in the foregoing voltage regulation process, and therefore details are not described herein.

It should be noted that, the complementary metal-oxide semiconductor (CMOS) has advantages such as a simple manufacturing process and a small occupied area, and is widely used in a large-scale circuit. Therefore, the foregoing embodiment of this application mainly describes the LDO 100 based on a CMOS component. A person skilled in the art should know that, in some circuits at small integration scales, a component such as a bipolar junction transistor (BJT) may alternatively be used. Correspondingly, the NMOS transistor used in the LDO 100 may be replaced with an NPN-type BJT, and the PMOS transistor used in the LDO 100 may be replaced with a PNP-type BJT. Correspondingly, when the error amplifier $M_1$ that uses a common-gate arrangement is replaced with a PNP-type BJT, a common-base arrangement may be used; and when the loop gain amplifier $M_2$ that uses a common-source arrangement is replaced with an NPN-type BJT, a common-emitter arrangement may be used. Therefore, based on the idea of embodiments of this application, when the BJT is used to implement the LDO, it may be considered as an equivalent replacement of embodiments of this application, and should fall within the protection scope of this application.

In addition to having a basic function of voltage regulation, the LDO 100 provided in this embodiment of this application can meet requirements such as low power and a small area of chip design because of a small quantity of used transistors and a simple circuit structure. In addition, the small quantity of transistors means that the LDO has a small quantity of noise sources, so that low system noise can be implemented, thereby facilitating on-chip integration. More importantly, in addition to the foregoing advantages, the LDO 100 also has high-frequency high-PSRR performance.

Figure 4:
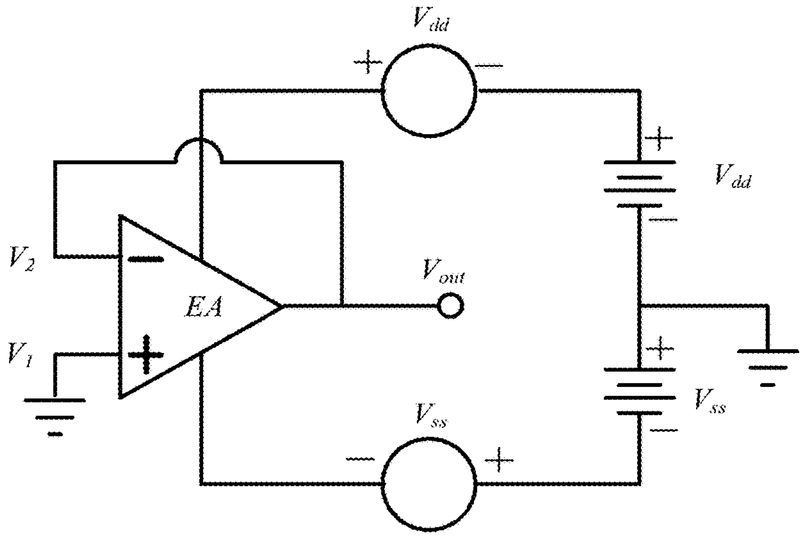
FIG. 4 is an equivalent circuit diagram of an LDO implemented based on negative feedback.
Figure 5:
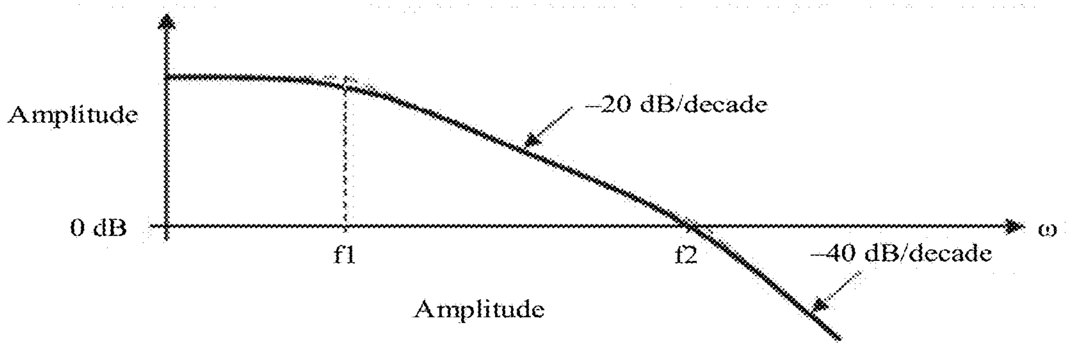
FIG. 5 is a schematic of an amplitude-frequency characteristic of an error amplifier in an LDO.
Figure 6:
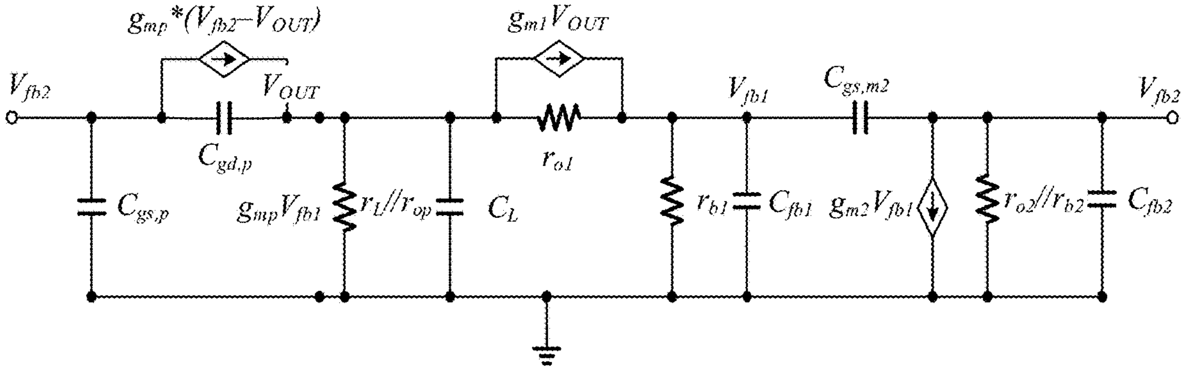
FIG. 6 is a diagram of a small-signal principle of the LDO shown in FIG. 3.

With reference to FIG. 4 to FIG. 6, the following describes in detail the high-frequency PSRR performance of the LDO 100 shown in FIG. 3.

As shown in FIG. 4, for a negative-feedback LDO system, system gains are mainly classified into two types: 1. a loop gain $A_v$ of the system; and 2. a small-signal gain $A_{dd}$ from a supply voltage $V_{dd}$ to an output voltage through a power transistor $M_{pass}$.

In FIG. 4, $V_1$ represents a voltage of a non-inverting input end of an error amplifier, $V_2$ represents a voltage of an inverting input end of the error amplifier, and $V_{ss}$ represents a ground voltage. The output voltage $V_{out}$ of the system may be represented by using a formula (4):

$$V_{out} = A_{dd}V_{dd} + A_v(V_1 - V_2) = A_{dd}V_{dd} - A_vV_{out} \tag{4}$$

The following formula (5) may be obtained by transforming the formula (4):

$$V_{out}(1 + A_v) = A_{dd}V_{dd} \tag{5}$$

An amplitude-frequency characteristic of the error amplifier is usually shown in FIG. 5. It can be seen from FIG. 5 that, at a low frequency, amplitude of a signal amplified by the error amplifier is very large, and a loop gain $A_v$ provided by the EA is far greater than 1.

Therefore, the following formula may be further obtained based on the formula (5):

$$\frac{V_{out}}{V_{dd}} = \frac{A_{dd}}{1 + A_v} \approx \frac{A_{dd}}{A_v} = \frac{1}{PSRR} \tag{6}$$

According to the formula (6), it can be learned that to improve a PSRR of the system, the loop gain $A_v$ needs to be increased and $A_{dd}$ needs to be reduced.

FIG. 5 further shows that, as frequency increases, the amplitude of the signal amplified by the error amplifier gradually decreases. For example, when the frequency changes from a low frequency $f_1$ to a high frequency $f_2$, the amplitude of the signal decreases by 20 dB. Correspondingly, a loop gain $A_v$ provided by the error amplifier also significantly decreases with the increase of the frequency. To be specific, due to a limitation of the amplitude-frequency characteristic of the error amplifier, in a high-frequency application scenario, the PSRR of the system cannot be improved by increasing the loop gain $A_v$. Instead, the PSRR of the system can only be improved by reducing $A_{dd}$.

However, for the LDO, of the CAS-FVF structure, shown in FIG. 1, the power transistor $M_p$ of the LDO is a PMOS transistor. According to the formula (1), it can be learned that the supply voltage $V_{dd}$ may be fed to the output voltage $V_{out}$ through coupling by using a source-drain parasitic capacitance of the power transistor $M_p$. Further, it can be learned from small-signal analysis that, it may be considered that a resistance $R_p$ between the power supply end $V_{dd}$ and the "node A" in FIG. 1 is obtained through parallel connection between a resistance $1/g_{mp}$ generated by the transconductance of the power transistor $M_p$ and an internal resistance Top of the power transistor $M_p$, as shown in formula (7):

$$R_p = 1/g_m // r_{op} \tag{7}$$

Further, the small-signal gain $A_{dd}$ from the supply voltage $V_{dd}$ directly to the output through the power transistor $M_{pass}$ meets a relationship shown in the following formula (8):

$$A_{dd} = \frac{\partial V_{out}}{\partial V_{dd}} \approx \frac{R_l}{R_p + R_l} \approx \frac{R_l}{R_p}, \tag{8}$$

where $R_l$ is a resistance seen from a load end, and $R_l$ is far less than $R_p$.

Therefore, it can be learned that, to reduce $A_{dd}$, $R_p$ needs to be increased. However, in FIG. 1, the power transistor $M_p$ is responsible for providing a large current. According to the formula (1), it can be learned that the supply voltage $V_{dd}$ and the output voltage $V_{out}$ are fixed. Therefore, to provide a large current, the power transistor $M_p$ is required to have a large transconductance $g_{mp}$. Therefore, the transconductance $g_{mp}$ cannot be smaller. However, a larger transconductance $g_{mp}$ indicates smaller $R_p$. As a result, it is difficult to reduce the gain $A_{dd}$ of the system in a high frequency band. Therefore, it can be learned that the LDO, of the CAS-FVF structure, shown in FIG. 1 can present a good PSRR at a low frequency, but cannot implement a high PSRR in a high frequency band.

A person skilled in the art should know that, in a current integrated circuit, both an analog circuit and a digital circuit are usually integrated, and existence of the digital circuit causes large power supply noise in a supply voltage $V_{dd}$ of the integrated circuit. Therefore, when the LDO, of the CAS-FVF structure, shown in FIG. 1 is used to supply power to the analog circuit, because the power transistor Mp is a PMOS transistor, as shown in the formula (1), as an input voltage of the source of the PMOS transistor, the supply voltage $V_{dd}$ is fed to the output voltage $V_{out}$ of the drain of the PMOS transistor. This also severely affects performance of the analog circuit.

However, in the LDO 100 shown in FIG. 3 in this application, according to the formula (2), it can be learned that the first power transistor $M_{pass}$ is an NMOS transistor, and the output current $I_{out}$ of the first power transistor is mainly related to the second feedback voltage $V_{fb2}$ input to the gate and the output voltage $V_{out}$ and is decoupled from the supply voltage $V_{dd}$. Therefore, a slight part of the supply voltage $V_{dd}$ is coupled to the output voltage $V_{out}$, and correspondingly, $A_{dd}$ naturally decreases, to ensure that the PSRR can be improved, and meet a power supply noise rejection requirement of a radio frequency component sensitive to a high-frequency PSRR, such as an LNA, a VCO, a PLL, or a mixer.

The foregoing content theoretically analyzes how the LDO 100 in this application improves a PSRR and enhances a power supply noise rejection capability. The following more intuitively describes, from another dimension, how the LDO 100 in this application has a high power supply noise rejection capability. The LDO 100 uses the NMOS transistor as the first power transistor $M_{pass}$. The output current $I_{out}$ of the source of the NMOS transistor is mainly related to the output voltage $V_{out}$ and the second feedback voltage $V_{fb2}$ input to the gate. Impact of the supply voltage $V_{dd}$ received by the drain of the NMOS transistor on the output current $I_{out}$ can be almost ignored. Correspondingly, a change of the supply voltage $V_{dd}$ due to factors such as noise has almost no impact on the output voltage $V_{out}$. Therefore, the LDO 100 can isolate, to a great extent, adverse impact caused by power supply noise of the supply voltage $V_{dd}$, thereby further improving noise performance compared with the LDO, of the CAS FVF architecture, shown in FIG. 1.

Further, FIG. 6 is a diagram of a small-signal principle of the LDO 100 shown in FIG. 3. According to FIG. 6, it can be learned that the LDO 100 provided in this embodiment of this application is actually a three-stage gain negative-feedback system. A first-stage gain is $A_1=g_{mp}/[g_{mp}+1/(r_L/r_{op})]$, a second-stage gain is $A_2=(g_{m1}r_{o1}+1)*r_{b1}/(r_{b1}+r_{o1})$, and a third-stage gain is $A_3=-g_{mp}*(r_{mp}/r_L)$. $r_{o1}$ is an internal resistance of the error amplifier $M_1$, $r_{o2}$ is an internal resistance of the loop gain amplifier $M_2$, $r_{op}$ is an internal resistance of the first power transistor $M_{pass}$, $g_{m1}$ is a transconductance of the error amplifier $M_1$, and $g_{m2}$ is a transconductance of the loop gain amplifier $M_2$. For other equivalent circuits, refer to the descriptions in the foregoing embodiments. Therefore, at a low frequency, the LDO 100 can implement a high loop gain $A_v$, so that the LDO 100 has a high PSRR at the low frequency; and at a high frequency, $A_{dd}$ is reduced, to also implement a high PSRR.

It should be noted that, in this application, a dropout of the first power transistor $M_{pass}$ of the LDO 100 is greater than a dropout of the LDO, of the CAS-FVF structure, shown in FIG. 1, because the dropout of the first power transistor $M_{pass}$ of the LDO 100 includes a threshold voltage of the first power transistor. However, in a high-frequency application scenario, for a component sensitive to a high-frequency PSRR, it is feasible to obtain higher high-frequency PSRR performance than that of the LDO of the CAS-FVF structure at the expense of a small amount of dropout. Therefore, the LDO 100 provided in this embodiment of this application brings a better balance in integrated circuit design.

Figure 7:
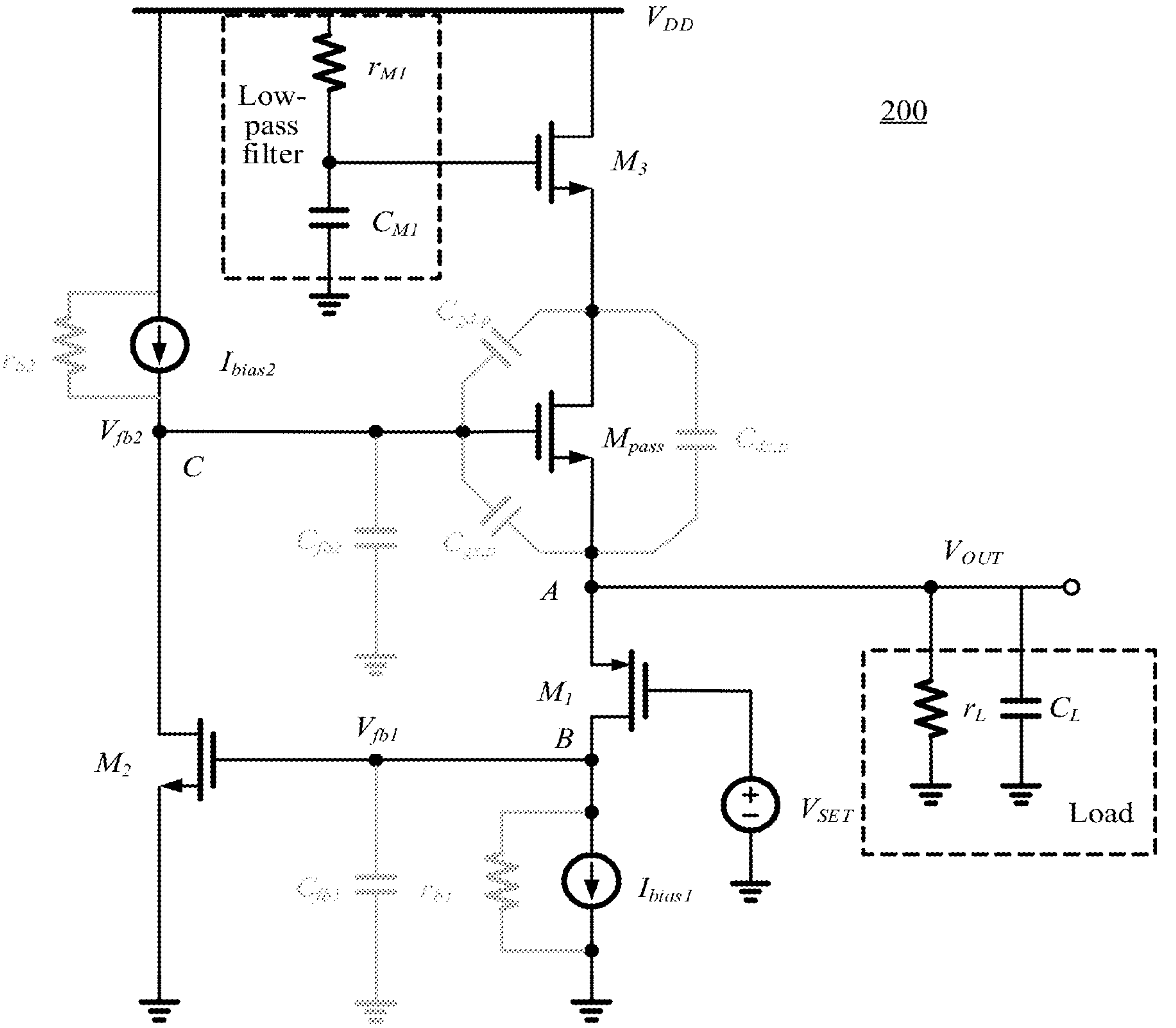
FIG. 7 is a schematic of another LDO that can be used in a high frequency band according to an embodiment of this application.

Further, this application further improves the LDO 100 shown in FIG. 3, and provides another LDO 200 having a higher PSRR in a high frequency band. As shown in FIG. 7, the LDO 200 includes a first power transistor $M_{pass}$, an error amplifier $M_1$, a loop gain amplifier $M_2$, and a second power transistor $M_3$.

The first power transistor $M_{pass}$ is an NMOS transistor. A drain of the first power transistor $M_{pass}$ is coupled to a power supply end to receive a supply voltage $V_{dd}$. As a power transistor, the first power transistor $M_{pass}$ provides an output current $I_{out}$ for a load at a "node A" through a source under an action of a second feedback voltage $V_{fb2}$ input to a gate.

In FIG. 7, the error amplifier $M_1$ is a common-gate amplifier based on a PMOS. A source of the error amplifier $M_1$ is coupled to the source of the first power transistor $M_{pass}$ at the "node A". A drain of the error amplifier $M_1$ is connected to a first bias current source $I_{bias1}$. A gate of the error amplifier $M_1$ is connected to a first bias voltage source $V_{set}$. The first bias voltage source $V_{set}$ is configured to provide a reference voltage, and the first bias current source $I_{bias1}$ is configured to provide a bias current for the error amplifier $M_1$. The error amplifier $M_1$ is configured to receive an output voltage $V_{out}$ of the LDO at the "node A" through the source of the error amplifier, compare the output voltage with the reference voltage $V_{set}$ coupled to the gate of $M_1$, and output, through the drain of the error amplifier $M_1$, a first feedback voltage $V_{fb1}$ that reflects a change of the output voltage $V_{out}$, to be specific, provide a negative feedback.

The loop gain amplifier $M_2$ is a common-source amplifier. A gate of the loop gain amplifier $M_2$ is coupled to the drain of the error amplifier $M_1$ at a "node B". A source of the loop gain amplifier $M_2$ is grounded. A drain of the loop gain amplifier $M_2$ is coupled to the power supply end $V_{dd}$ through a second bias current source $I_{bias2}$. The loop gain amplifier $M_2$ receives, through the gate of the loop gain amplifier, the first feedback voltage $V_{fb1}$ fed back from the drain of the error amplifier $M_1$, and outputs a second feedback voltage $V_{fb2}$ from the drain of the loop gain amplifier $M_2$ after gain amplification.

At a "node C", the second feedback voltage $V_{fb2}$ is input to the gate of the first power transistor $M_{pass}$, to perform feedback control on the output current of the first power transistor $M_{pass}$.

Structures and functions of the first power transistor $M_{pass}$, the error amplifier $M_1$, and the loop gain amplifier $M_2$ are basically similar to those of the elements in FIG. 3, and therefore mutual reference can be made.

Different from the LDO 100 shown in FIG. 3, the drain of the first power transistor $M_{pass}$ receives the supply voltage $V_{dd}$ through the second power transistor $M_3$. Specifically, the second power transistor $M_3$ is an NMOS transistor. The drain of the first power transistor $M_{pass}$ is coupled to a source of the second power transistor $M_3$. A drain of the second power transistor $M_3$ is coupled to the power supply end. The second power transistor $M_3$ receives the supply voltage $V_{dd}$ through the drain, and provides an operating voltage for the first power transistor $M_{pass}$ through the source of the second power transistor.

The LDO 200 shown in FIG. 7 further includes a low-pass filter. The low-pass filter is coupled to the power supply end and is configured to provide a gate control voltage for the second power transistor $M_3$ after performing low-pass filtering on the supply voltage $V_{dd}$.

For example, the low-pass filter may include a first resistor $r_{M1}$ and a first capacitor $C_{M1}$. A first end of the first resistor $r_{M1}$ is coupled to the power supply end. A second end of the first resistor $r_{M1}$ is coupled to a first end of the first capacitor $C_{M1}$. A second end of the first capacitor $C_{M1}$ is coupled to the ground. The gate control voltage is provided for the second power transistor $M_3$ through a point on a connection line between the second end of the first resistor $r_{M1}$ and the first end of the first capacitor $C_{M1}$. A person skilled in the art should know that a low-frequency component can pass through an inductor, and a high-frequency component can pass through a capacitor. Therefore, after a high-frequency component in the supply voltage $V_{dd}$ is filtered through the first resistor $r_{M1}$, a residual high-frequency component is coupled to the ground through the first capacitor $C_{M1}$ such that a low-frequency component in the supply voltage $V_{dd}$ can be provided for the second power transistor $M_3$ as the gate control voltage.

It should be learned that the low-pass filter may alternatively be implemented by using another circuit structure. This is not limited in this application.

In the foregoing design, the LDO 200 provided in this embodiment of this application can further isolate power supply noise in the supply voltage $V_{dd}$, to improve noise performance of a system.

In the LDO 200, the second power transistor $M_3$ can further reduce $A_{dd}$, and an operating principle of the second power transistor is similar to the $A_{dd}$ reduction principle of the first power transistor $M_1$. Reference can be made to the foregoing analysis of how the first power transistor $M_1$ reduces $A_{dd}$. Details are not described herein. Because the first power transistor $M_1$ and the second power transistor $M_3$ are used to jointly reduce $A_{dd}$, the LDO 200 can implement a higher PSRR in a high frequency band. It should be learned that, although this application mainly emphasizes that the LDOs shown in FIG. 3 and FIG. 7 each have a high PSRR in a high frequency band compared with the existing LDO of the CAS-FVF structure. However, the LDOs shown in FIG. 3 and FIG. 7 in this application each are a three-stage gain negative-feedback system, and at a low frequency, a PSRR of the system may alternatively be improved by increasing a loop gain Av. Therefore, the LDOs shown in FIG. 3 and FIG. 7 are also used in a low-frequency application scenario.

Figure 8:
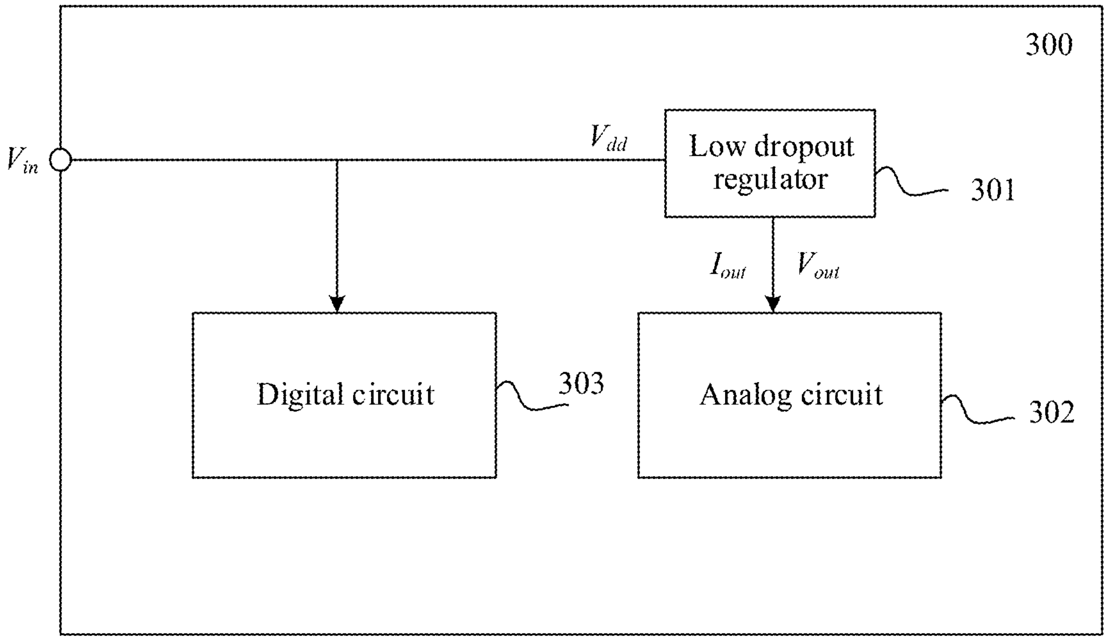
FIG. 8 is a schematic of an architecture of a chip using an LDO according to an embodiment of this application.

As shown in FIG. 8, this application further provides a chip 300 used in a high frequency band. The chip 300 may include a supply voltage input end $V_{in}$, a low-dropout regulator 301, and an analog circuit 302.

The supply voltage input end $V_{in}$ is configured to provide an input voltage for the chip. The input voltage may be transformed through a power supply management unit (not shown in the figure) to generate the foregoing supply voltage $V_{dd}$.

The low-dropout regulator 301 is coupled to the supply voltage input end $V_{in}$ and is configured to: after performing low-dropout regulation on the supply voltage $V_{dd}$, provide an output voltage $V_{out}$ and an output current $I_{out}$ to supply power to the analog circuit 302. For the low-dropout regulator 301, refer to the LDO 100 or the LDO 200 provided in the foregoing embodiment. The analog circuit 302 is the load shown in FIG. 3 or FIG. 7. It should be known that the low-dropout regulator 301 may alternatively be integrated with the power supply management unit.

For example, the chip 300 may be a chip such as a radio frequency transceiver used in high-frequency communication, and the analog circuit 302 may be at least one of components such as an LNA, a VCO, and a mixer in the radio frequency transceiver. The low-dropout regulator 301 shown in FIG. 3 or FIG. 7 in this application is used, so that a PSRR of the chip 300 in a high frequency band can be improved. Therefore, the chip 300 has good PSRR performance in both a low frequency band and a high frequency band, thereby meeting a performance requirement of an analog component sensitive to a high-frequency PSRR, such as an LNA, a VCO, a PLL, or a mixer. In addition, the chip 300 may be a wireless communication chip such as a Wi-Fi chip sensitive to a residual ripple in the output voltage, or an optical image sensor.

Further, the chip 300 may further include a digital circuit 303. The supply voltage $V_{dd}$ provided by the supply voltage input end $V_{in}$ may supply power to the digital circuit 303. In other words, the chip 300 may be a digital-analog hybrid chip. With development of communication technologies, analog components such as a radio frequency front end and an analog front end are to be gradually integrated in SoC chip design in the future, to be specific, the radio frequency transceiver, the Wi-Fi chip, or the like is also to be integrated into a SoC. However, there is a large quantity of digital logic circuits such as a digital baseband in the SoC. Because an operating voltage of the digital circuit has a high/low level transition characteristic, the supply voltage $V_{dd}$ is usually obtained after the power supply management unit regulates, based on a switch circuit such as BUCK or BOOST, the input voltage provided by the supply voltage input end $V_{in}$. As a result, the supply voltage $V_{dd}$ definitely has large power supply noise. However, the low-dropout regulator 301 provided in this embodiment of this application further has a function of isolating power supply noise from the output voltage $V_{out}$, and can significantly reduce impact of the power supply noise on the output voltage $V_{out}$. Therefore, the low-dropout regulator 301 has a good power supply noise rejection capability at both a low frequency and a high frequency, and can bring more options to design of a digital-analog hybrid SoC chip.

The foregoing descriptions are merely specific implementations of this application, but the protection scope of this application is not limited thereto. Any variation or replacement made by a person skilled in the art based on the principles of this application within the technical scope disclosed in this application shall fall within the protection scope of this application.

What is claimed is:

1. A low-dropout regulator, comprising:
- an error amplifier configured to generate a first feedback voltage based on a reference voltage and an output voltage for a load, wherein the error amplifier is a common-gate amplifier;
- a power supply end;
- a first power transistor, wherein the first power transistor is a first N-channel metal-oxide-semiconductor (NMOS) transistor comprising:
  - a first drain coupled to the power supply end;
  - a first source configured to provide an output current for the load; and
  - a first gate configured to receive a second feedback voltage;
- a loop gain amplifier configured to generate the second feedback voltage based on the first feedback voltage, wherein the loop gain amplifier is a common-source amplifier;
- a second power transistor, wherein the second power transistor is a second NMOS transistor comprising a second gate; and
- a low-pass filter separately coupled to the power supply end and the second gate.

2. The low-dropout regulator of claim 1, further comprising a first bias voltage source configured to provide the reference voltage, wherein the error amplifier is a P-channel metal-oxide-semiconductor (PMOS) transistor comprising:
- a second source coupled to the first source and the load at one point;
- a third gate coupled to the first bias voltage source; and
- a second drain configured to output the first feedback voltage.

3. The low-dropout regulator of claim 2, further comprising a ground, wherein the loop gain amplifier is a third NMOS transistor comprising:
- a fourth gate coupled to the second drain;
- a third source coupled to the ground; and
- a third drain configured to output the second feedback voltage.

4. The low-dropout regulator of claim 3, wherein the third drain is coupled to the first gate.

5. The low-dropout regulator of claim 3, further comprising a first bias current source comprising:

a first end coupled to the second drain; and a second end coupled to the ground.

6. The low-dropout regulator of claim 5, further comprising a second bias current source comprising:

a third end coupled to the power supply end; and a fourth end coupled to the third drain and the first gate at one point.

7. The low-dropout regulator of claim 1, wherein the first drain is coupled to the power supply end through the second NMOS transistor.

8. The low-dropout regulator of claim 7, wherein the second NMOS transistor further comprises:

a second source coupled to the first drain; and a second drain coupled to the power supply end.

9. The low-dropout regulator of claim 1, further comprising a ground, wherein the low-pass filter comprises a first resistor and a first capacitor, wherein a first end of the first resistor is coupled to the power supply end, wherein a second end of the first resistor is coupled to a first end of the first capacitor and the second gate at one point, and wherein a second end of the first capacitor is coupled to the ground.

10. A chip comprising:

a supply voltage input end configured to provide a supply voltage;

an analog circuit; and a low-dropout regulator configured to perform low-dropout regulation on the supply voltage to generate an output voltage for a load, configured to supply power to the analog circuit based on the output voltage, and comprising:

an error amplifier configured to generate a first feedback voltage based on a reference voltage and the output voltage, wherein the error amplifier is a common-gate amplifier;

a power supply end;

a first power transistor, wherein the first power transistor is a first N-channel metal-oxide semiconductor (NMOS) transistor comprising:

a first drain coupled to the power supply end;

a first source configured to provide an output current for the load; and a first gate configured to receive a second feedback voltage;

a loop gain amplifier configured to generate the second feedback voltage based on the first feedback voltage, wherein the loop gain amplifier is a common-source amplifier;

a second power transistor, wherein the second power transistor is a second NMOS transistor comprising a second gate; and a low-pass filter separately coupled to the power supply end and the second gate.

11. The chip of claim 10, wherein the chip is a radio frequency transceiver.

12. The chip of claim 10, wherein the chip is a Wi-Fi chip.

13. The chip of claim 10, wherein the analog circuit is a low-noise amplifier.

14. The chip of claim 10, wherein the analog circuit is a voltage-controlled oscillator.

15. The chip of claim 10, wherein the analog circuit is a phase-locked loop.

16. The chip of claim 10, wherein the analog circuit is a frequency mixer.

17. The chip of claim 10, further comprising a digital circuit coupled to the supply voltage input end.

18. The chip of claim 10, wherein the low-dropout regulator further comprises a first bias voltage source configured to provide the reference voltage, and wherein the error amplifier is a P-channel metal-oxide-semiconductor (PMOS) transistor comprising:

a second source coupled to the first source and the load at one point;

a third gate coupled to the first bias voltage source; and a second drain configured to output the first feedback voltage.

19. The chip of claim 18, wherein the low-dropout regulator further comprises a ground, wherein the loop gain amplifier is a third NMOS transistor comprising:

a fourth gate coupled to the second drain;

a third source coupled to the ground; and a third drain configured to output the second feedback voltage.

20. The chip of claim 19, wherein the third drain is coupled to the first gate.

* * * * *